United States Patent [19]
Zipper

[11] Patent Number: 5,133,038
[45] Date of Patent: Jul. 21, 1992

[54] FIBER OPTIC SPLICE CASE

[75] Inventor: James D. Zipper, Elmhurst, Ill.

[73] Assignee: Reliance Comm/Tec. Corporation, Chicago, Ill.

[21] Appl. No.: 646,188

[22] Filed: Jan. 28, 1991

Related U.S. Application Data

[62] Division of Ser. No. 510,071, Apr. 17, 1980.

[51] Int. Cl.$^5$ .............................................. G02B 6/36
[52] U.S. Cl. ..................... 385/135; 385/138; 385/139; 174/50
[58] Field of Search ............. 350/96.2, 96.21; 174/50, 63, 65 R, 67; 385/135, 138, 139

[56] References Cited

U.S. PATENT DOCUMENTS

| | | | |
|---|---|---|---|
| 3,872,234 | 3/1975 | Smith | 174/50 |
| 4,365,108 | 12/1982 | Bright | 174/50 |
| 4,644,095 | 2/1987 | Bright et al. | 174/50 |
| 4,717,231 | 1/1988 | Dewez et al. | 350/96.2 |
| 4,805,979 | 2/1989 | Bossard et al. | 350/96.2 |
| 4,824,196 | 4/1989 | Bylander | 350/96.20 |
| 4,971,421 | 11/1990 | Ori | 350/96.20 |

*Primary Examiner*—Akm E. Ullah
*Assistant Examiner*—Stephen W. Barns
*Attorney, Agent, or Firm*—Trexler, Bushnell, Giangiorgi & Blackstone, Ltd.

[57] ABSTRACT

Fiber optic splice case for retaining at least one primary cable and a plurality of service cables in spliced connection. The case includes removably interconnectable members including a base member and a top or cover member. The case is divided into at least two chambers to retain carrier and service fibers in an orderly and sufficiently radiied arrangement. Sealing members are provided and include one seal around the primary cable projecting into the case which seals the case without employing tapes or sealants. Mounting portions retain the case and permit convenient projection of the case from a protective housing for access to the splice connections.

19 Claims, 4 Drawing Sheets

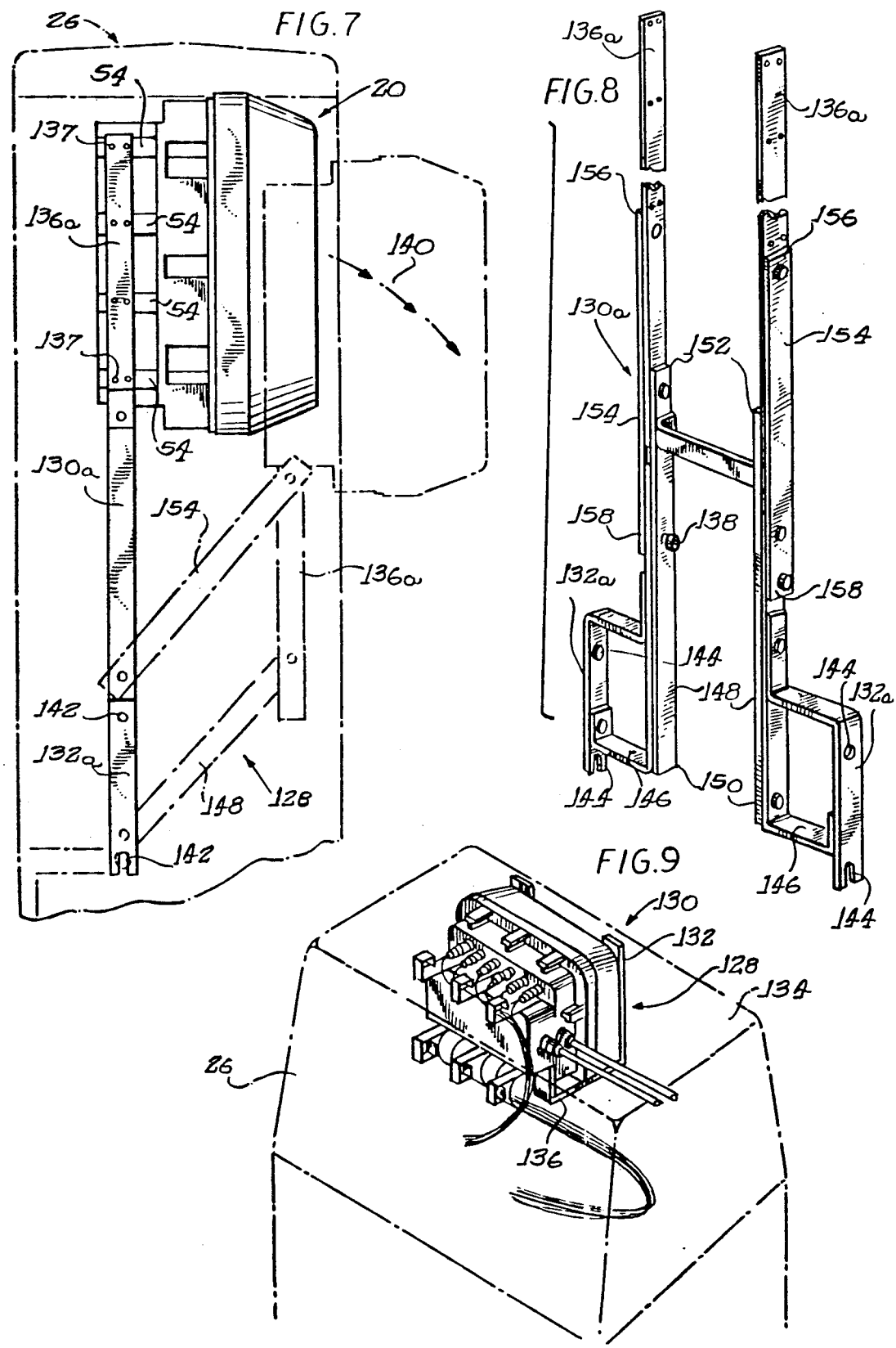

FIBER OPTIC SPLICE CASE

This is a divisional of copending application Ser. No. 07/510,071 filed on Apr. 17, 1990.

BACKGROUND OF THE INVENTION

This invention relates to the fiber optics splice enclosure art.

Currently, fiber optic cables are in wide use in telecommunications and data communications because of the high volume and high rate at which data can be transmitted over such cables. Many systems previously using conventional electrically conductive cabling have been or are being converted into fiber optic cables. Increased use of fiber optic cables has presented new problems requiring new solutions to be devised to accommodate the characteristics of fiber optic cables.

It is common to install a multi-carrier fiber primary cable to provide telecommunications service to a predetermined area. The primary cable, consisting of perhaps approximately 100 individual carrier fibers, is installed. At specific points along the cable, connections must be made to direct individual service fibers to the end users. Primary cables are typically very long continuous cables and therefore cannot be manufactured with the specific service fiber length at the specific breakoff points. In this situation, it becomes necessary to extract specific carrier fibers from the primary cable and to splice the carrier fiber with service fibers which are routed to the end user location.

Routing and splicing of fiber optic cables as described above is constrained by certain physical limitations of the fiber optic material. For example, one limitation is that fiber optic cables cannot be bent beyond a predetermined minimum radius. Over-bending of the fiber optic cables may kink, crack or break the cable thus interfering with light propagation in the cable thereby impairing the transmission capabilities of the cable. Fiber optic cables also have special splicing requirements for joining two pieces of cable to assure proper propagation of light transmitted through the joined area. As with other data transmission mediums, when the need arises to connect cables it is desirable to permit the connections to be made quickly and easily.

Additionally, it is important to provide a protected environment for the connections between the carrier fibers and the service fibers to assure high quality data transmission. When the carrier and service fibers are weld spliced it is important to assure that the connection is properly retained and will not be exposed to damaging stresses. When mechanical connectors are used to join the carrier and service fibers, it is important to assure that the connections be protected from detrimental environmental effects. Moisture, dust and dirt as well as protective sealants may accumulate between the mechanical connections and thereby impair data transmission.

Prior art fiber optic cable enclosures for the most part are modified variations of electrical splice casings. In electrical enclosures wires may be bent at a very tight radius and the wires are usually fastened with screws or similar fasteners directly to a terminal member. As such, these casings often do not provide sufficient space to accommodate fiber optic cable radius requirements and do not provide means for securely retaining a fiber optic connection therein. Further, prior art fiber optic splice cases are difficult to access and are difficult to seal requiring tapes and/or grease type sealants. As an additional problem, with the prior art fiber optic splice enclosures, often such enclosures are mounted in such a way that access by field personnel is very difficult.

OBJECTS AND SUMMARY OF THE INVENTION

It is an object of the present invention to provide a fiber optics splice case for retaining a primary fiber optic cable in a spliced connection with a service cable.

Another object of the present invention is to provide a fiber optics splice case which retains a splice connection and houses a sufficient portion of a loop through cable to which service fibers may be connected.

A more specific object of the present invention is to provide an environmentally sealed fiber optics splice case which protects the splice connections therein from detrimental environmental effects.

Yet another object of the present invention is to provide a fiber optics splice case which is environmentally sealed and seals the primary cable without taping or sealants.

Another object of the present invention is to provide a fiber optics splice case which may be conveniently accessed to permit efficient servicing in the field.

Briefly, and in accordance with the foregoing, the present invention comprises a fiber optic splice case which retains at least one primary cable and a plurality of service cables in spliced connection therewith. The case includes removably interconnectable members including a base member and a top or cover member. The case is divided into at least two chambers to retain carrier and service fiber in an orderly and sufficiently radiied arrangement. The present invention provides environmental sealing of the primary cable where it projects into the case without employing tapes or sealants. Finally, the case is retained by mounting means which permit convenient projection of the case from a protective housing and access to the splice connections therein.

BRIEF DESCRIPTION OF THE DRAWINGS

The organization and manner of the operation of the invention, together with further objects and advantages thereof, may be understood best by reference to the following description taken in connection with the accompanying drawings wherein like reference numerals identify like elements and in which:

FIG. 7 is a side elevational view of the splice case attached to mounting means which permit the case attached thereto to swing out of a protective pedestal housing permitting access to the case without damage to the cables connected thereto;

FIG. 8 is an enlarged detailed perspective view of the mounting means as shown in FIG. 7; and FIG. 9 is a rear perspective view of the splice case mounted to mounting means in a protective vault housing.

DETAILED DESCRIPTION OF THE ILLUSTRATED EMBODIMENT

Figure 2:
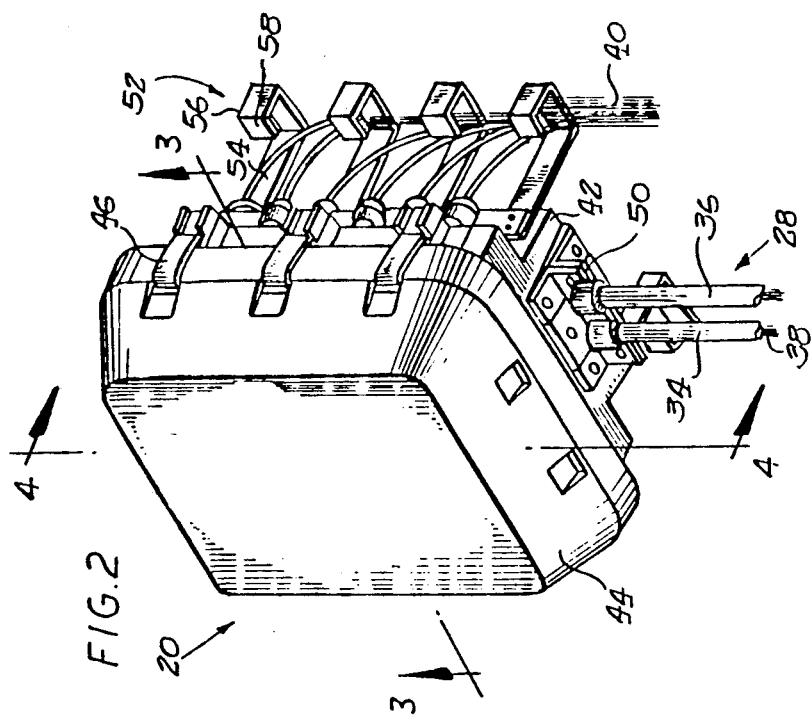
FIG. 2 is an enlarged detailed lower front perspective view of the splice case illustrated in FIG. 1 showing a loop through cable projecting into and exiting from the casing as well as service cables projecting into the case.

While this invention may be susceptible to embodiment in different forms, there is shown in the drawings and will be herein described in detail, specific embodiments of the present invention with the understanding that the present disclosure is to be considered an exemplification of the principles of the invention, and not intended to limit the invention to the embodiments illustrated and described herein.

It should be noted that dimensional relationships between members of the illustrated embodiments may vary in practice or may have been varied in the illustrations to emphasize certain features of the invention.

Figure 1:
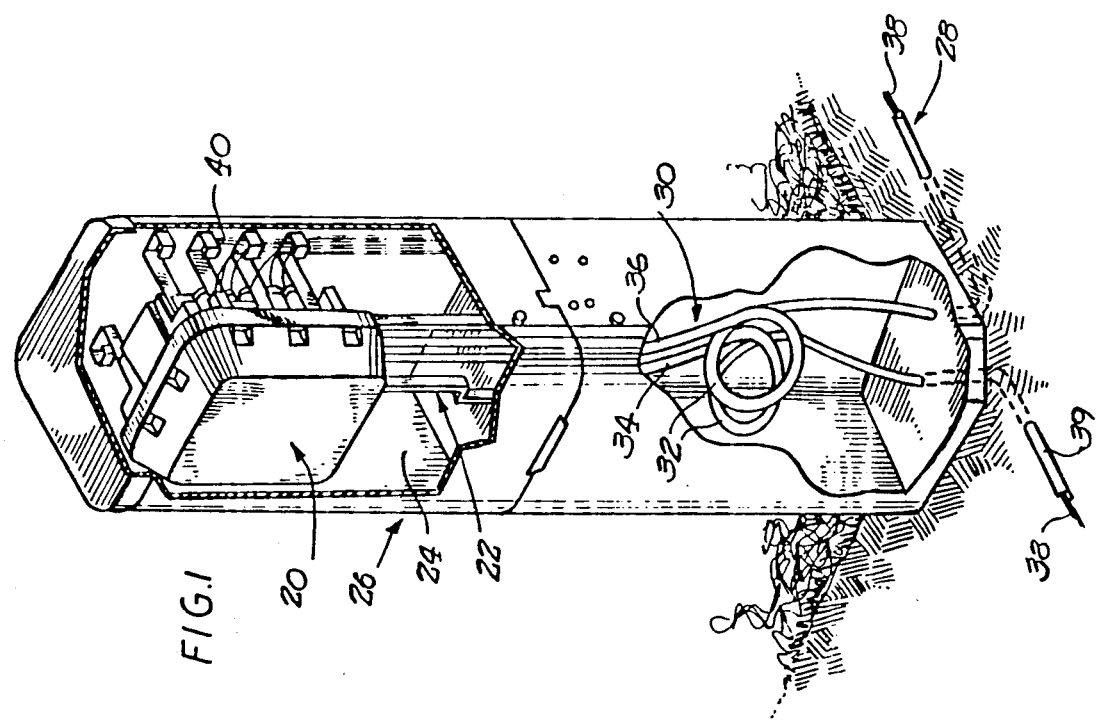
FIG. 1 is a perspective view of the fiber optic splice case mounted in a protective pedestal housing.

FIG. 1 shows a perspective view of a fiber optic splice case 20 attached to mounting means 22 which are attached to an inside surface 24 of a protective housing 26. The protective housing 26 as illustrated in FIG. 1 is of a known construction commonly referred to as a pedestal. A primary fiber optic cable 28 is installed beneath ground level and a looped section 30 is formed therein above ground level so that a number of fibers from the primary cable 28 may be accessed for routing service fibers therefrom to individual end users in the area. This type of arrangement is known as a loop through drop and is commonly used in the communications field. A pair of coiled cable portions 32 are retained in the pedestal 26 to provide slack in the cable providing greater service access to the cable case 20 and to prevent damage thereto.

The looped section 30 has an entering portion 34 and an exiting portion 36 projecting into and out of the casing 20, respectively. The primary cable 28 is composed of many individual carrier fibers 38 retained in a common jacket 39. Once inside of the splice case 20, the looped section 30 has a portion of the jacket 39 removed therefrom permitting access to the individual carrier fibers 38 retained therein. Selected carrier fibers 38 are spliced with corresponding service cables 40 (better shown in FIGS. 3-5) which exit the splice case 20 to provide service to discrete end users.

The enlarged perspective view of FIG. 2 provides greater detail of the components of the splice casing 20. The splice case 20 comprises a base member 42 on which is retained a top or cover member 44 by latch means or latches 46. A bottom member 48 (better shown in FIG. 3) is attached to the base member 42 opposite the top member 44.

While latches 46 are shown on only one side of case 20 in FIG. 2, is should be appreciated that there are also latches on the opposite side of the case and in addition there may be latches on the top and bottom of the case. All of those latches would be constructed as shown in FIG. 2. In one embodiment for case 20, each side had four such latches and the top and bottom had two such latches each for a total of 12 latches. For clarity of illustration, the latches have been omitted in their entirety from FIG. 1 and the bottom latches have been omitted from FIG. 2.

Figure 3:
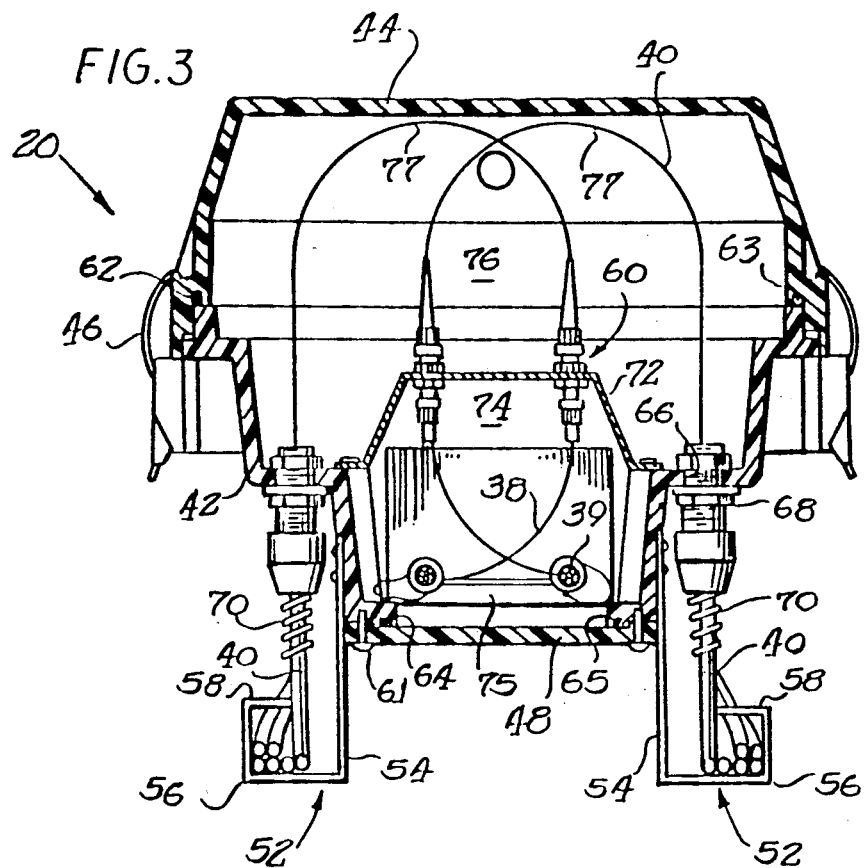
FIG. 3 is a cross-sectional view of the splice case illustrated in FIG. 2 taken along line 3—3 in FIG. 2.

First retaining means 50 are attached and retained on the case 20 for retaining the entering portion 34 and exiting portion 36 of the primary cable 28. Both the entering exiting portions 34, 36 are securely retained to prevent displacement of either portion and to protective the splice connections inside the case 20. Retaining means 50 also prevents extraction of the portions 34, 36 therefrom so as to prevent kinking of the looped section 30 retained within the case 20. Second retaining means 52 are attached to the base member 42 of the case 20 to support and route the service cables 40 exiting from the case 20. As shown in FIGS. 2 and 3, the second retaining means 52 is a generally J-shaped bracket which has extensions 54 leading away from the case 20 and generally rectangular cable guiding portions 56 on the ends of the extentions 54. Service cables 40 project out from the case 20 and gently curve underneath a distal end portion 58 of the guide portion 56.

FIG. 3 provides a partial cross-sectional view as taken along line 3—3 of FIG. 2 to better show the details of the case 20 and splice connections 60 retained therein. The top member 44 is attached to the base member 42 by latch means 46 and the bottom member 48 is attached to the base member 42 by fasteners 61. Top member sealing means 62 and bottom member sealing means 64 seal the case, when assembled, against the external environment. Sealing means 62, 64 comprise O-rings or gaskets mounted in complementary peripheral grooves 63, 65, respectively. The top member 44 and the bottom member 48 are generally easily removable to permit access to the splice connections 60 retained therein. Service apertures 66 formed in the base member 42 provide a passage through which service fibers 40 extend from the case 20. Sealing fasteners 68 seal the case 20 from the external environment and strain relievers 70 prevent damaging kinking of the service fibers 40.

A case dividing means or bulkhead 72 accomplishes both the functions of dividing the case 20 into a first chamber 74 and a second chamber 76 as well as retaining splice connections 60 in secure engagement. As better shown in FIGS. 4 and 5, the bulkhead 72 is a generally continuous piece of rigid material which extends the length of the case 20 rising a distance above the bottom portion 48 to provide sufficient clearance to accommodate the looped end 75 of the primary fiber optic cable. Likewise, the second chamber 76 provides sufficient clearance between opposing surfaces of the bulkhead 72 and the top member 44 to accommodate at least the required cable radius bends 77.

Figure 4:
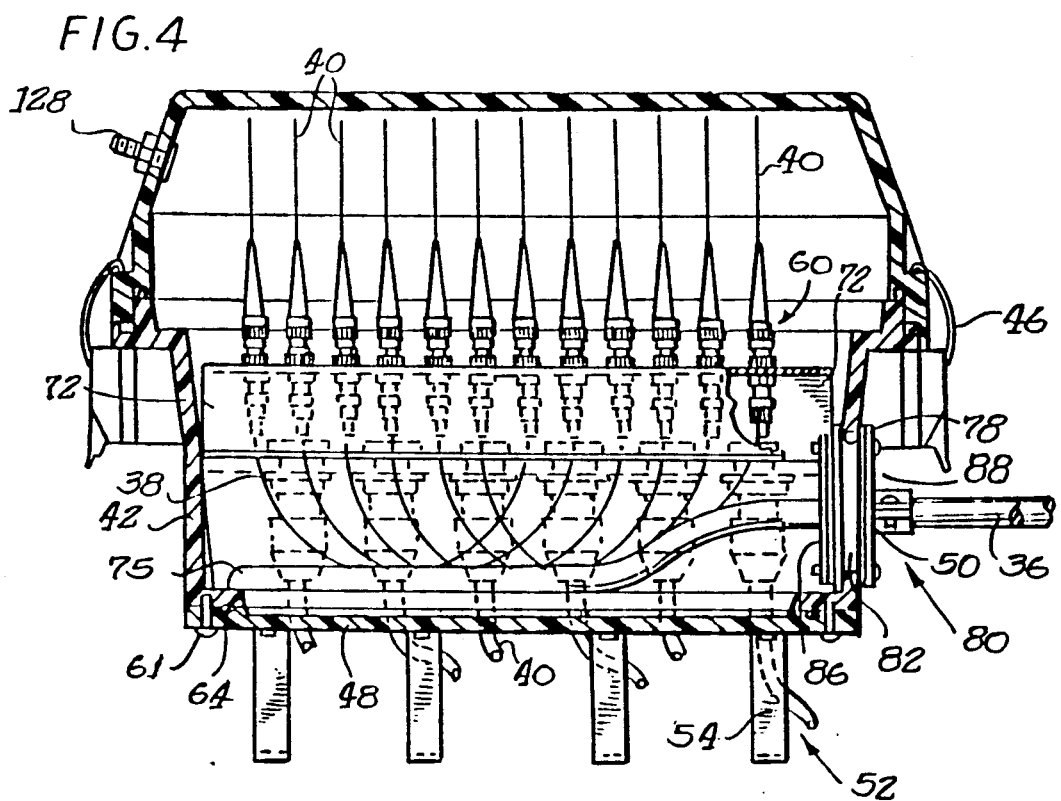
FIG. 4 is a transverse cross-sectional view of the splice case as illustrated in FIG. 2 taken along line 4—4 in FIG. 2 generally perpendicular to the cross-sectional view as illustrated in FIG. 3.
Figure 5:
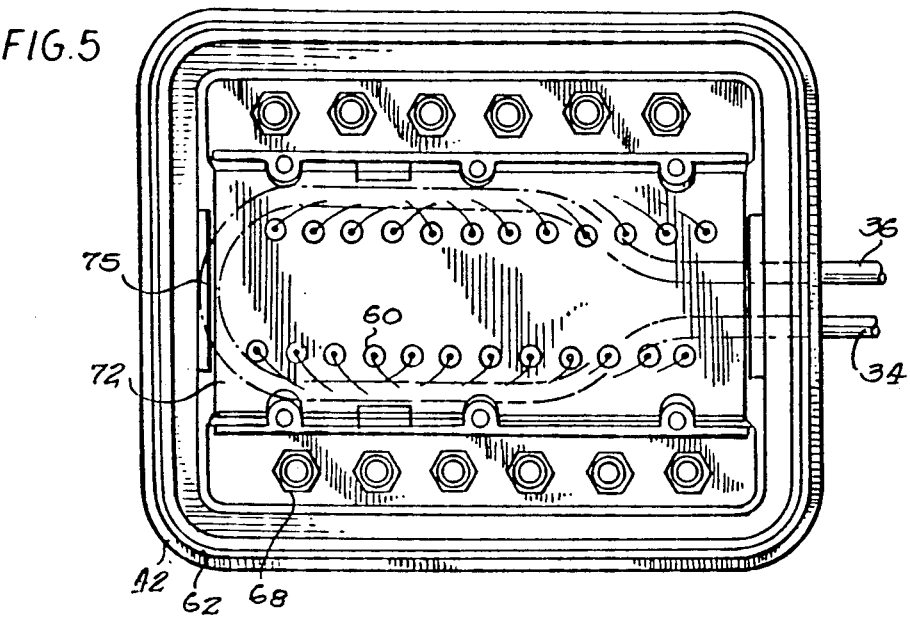
FIG. 5 is a plan view of the case illustrated in FIG. 2 which has been rotated 90° and with a top or cover member removed therefrom to illustrate the internal details of the splice case.

As shown in the cross-sectional view of FIG. 4 and the plan view of FIG. 5, the entering and exiting portions 34, 36 of the primary cable 28 are securely retained in a parallel side-by-side arrangement projecting through a common aperture 78 formed through a wall of the base member 42. The entering and exiting portions 34, 36 are retained in the aperture 78 by primary cable sealing means 80 which includes a resilient sealing member or puck 82 and puck retaining means 84. The puck retaining means 84 includes internal retaining means 86 and external puck retaining means 88.

Preferably, the sealing member or puck 82 is formed of a polyether or polyester based polyurethane with a Shore A hardness of 5 to 40. The puck 82 is composed of a material chosen to provide sealing of the splice case over a range of environmental stress factors including exposure to moisture, temperature, pressure and certain chemicals. This material chosen should provide optimum hydrolytic stability, low water absorption, resistance to dry heat aging, have a low compression set, and also be resistant to pollution chemicals commonly found in surface soil water tables. Ideally, the material should not vary appreciably from its initial properties when subjected to such stress factors in the field. For example, a preferred set of criteria for sufficient sealing include a minimum tensile strength of the material of substantially on the order of 75 psi; a minimum elongation of substantially on the order of 300%; minimum tear resistance of substantially on the order of 10 lbf/in; and compression set substantially on the order of 8% after 8 days at 70° F. under 25% compression. An example of a material satisfying these criteria is designated as Dexthane 400 which is a product available from Dexter/Hysol Corporation of Seabrook, N.H. This choice of material for the puck 82 assures that it will maintain an acceptable seal both about the periphery of opening 78 in the case and about the peripheries of entering and exiting cable portions 34, 36, when in service in the field.

Figure 6:
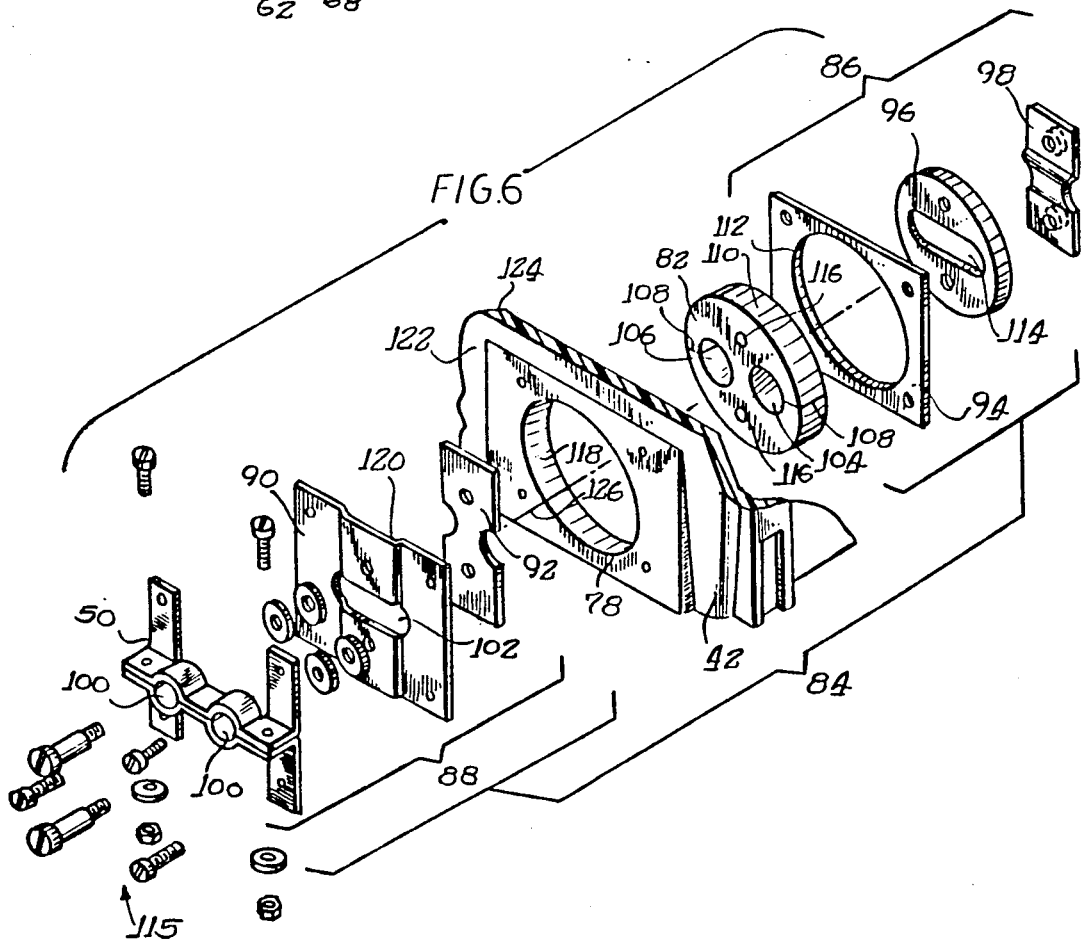
FIG. 6 is an enlarged detailed exploded view of primary cable sealing means and a fragmentary portion of the case to which the sealing means as illustrated are secured.

The primary cable sealing means 80 are illustrated in the exploded perspective view of FIG. 6. FIG. 6 better illustrates each of the components of the external puck retaining means 88 and the internal puck retaining means 86 and their function in sealing the entering and exiting portions 34, 36 projecting through the common aperture 78. The external puck retaining means 88 is comprised of the first retaining means 50, a front compression plate 90 and a horizontal positioning plate 92. The internal puck retaining means 86 comprises a back compression plate 94, a plate insert 96 and an internal horizontal positioning plate 98. The internal and external puck retaining means 86, 88 assemble as shown in FIG. 6 to compressibly retain the puck 82 therebetween in the common aperture 78.

Compressible retention of the puck 82 between the retaining means 86, 88 is accomplished by attaching the external puck retaining means components 88 to a looped section 30 of the primary cable 28, passing the looped section 30 through the common aperture 78 and assembling the puck 82 at the aperture 78 and then assembling the internal retaining means 86 to the end of the looped portion 30 to be retained inside the case 20.

Each of the entering and exiting portions 34, 36 is retained in a respective retaining sleeve 100 formed in the first retaining means 50. The looped section 30 then passes through an oblong bore 102 formed in the front compression plate 90 and the horizontal positioning plate 92 is positioned between the parallelly aligned entering and exiting portions 34, 36. The first retaining means 50 and the horizontal positioning plate 92 are each independently attached to the horizontal compression plate 90. Cable strain relief is provided by the first retaining means 50 and horizontal and vertical positioning externally of the case 20 is accomplished by the front compression plate 90 the horizontal positioning plates 92.

Retained as such, the assembled looped section 30 and external puck retaining means 88 is inserted through the common aperture 78 whereupon the sealing puck 82 is attached to the looped section 30. The sealing puck 82 is formed with a first bore 104 and a second bore 106 each bore receiving one of the entering and exiting portions 34, 36 of the primary cable 28. At least one radial slit 108 is formed extending radially from each of the bores 104, 106. At least one of the two radial slits 108 extends through an outside edge 110 of the puck 82. The slits 108 permit the puck 82 to be "opened" so that the bores 104, 106 can receive the entering and exiting portions 34, 36 of the primary cable 28. The cable 28 is inserted through a puck aperture 112 formed through the back compression plate 94 and through a second oblong bore 114 formed through the plate insert 96. The plate insert 96 cooperatively fits inside of the puck aperture 112 and the internal horizontal stabilizing plate 98 is inserted between the parallelly aligned entering and exiting portions 34, 36.

On opposite sides of the base member 42 the external puck retaining means 88 and internal puck retaining means 86 with the looped section 30 retained therewith are attached to the base member 42 by a number of fasteners 115. The front compression plate 90 and the back compression plate 94 are attached on opposite sides of the base member 42. Likewise, the horizontal positioning plate 92, plate insert 96 and internal horizontal positioning plate 98 are attached on respective sides of the puck 82 using one of fasteners 115 which also extend through fastener bores 116 formed through the puck 82. The horizontal positioning plates 92, 98 compress the puck 82 forcing the resilient material outwardly therefrom and compressing the outside edge 110 of the puck 82 against an inside edge 118 of the common aperture 78. The front compression plate 90 is formed with a recess 120 which receives the horizontal positioning plate 92 so that a generally planar surface abuts the sealing puck 82. The front compression plate 90 and horizontal positioning plate 92 generally mount flush to a front surface 122 of the base member 42. Similarly, the back compression plate 94 generally mounts flush to an inside surface 124 of the base member 42. Adjustment of the compressive forces imposed on the puck 82 retained in the common aperture 78 along a central axis 126 is achieved by adjusting the fasteners 115 retaining the plate insert 96 against the puck 82. Since the plate insert 96 cooperatively fits inside of the puck aperture 112 formed in the back compression plate 94 a degree of axial movement of the puck 82 is accommodated. The compression patterns of the sealing puck 82 generally seal the radial slits 108 and compress the bores 104, 106 thereby assuring proper sealing of the entering and exiting portions 34, 36 of the primary cable 28 in the common aperture 78.

With reference to FIG. 4, the case 20 is efficiently sealed by the sealing means including the top member sealing means 62, bottom member sealing means 64 and the primary cable sealing means 80. The sealing means provide sufficient forces to isolate the splice connections 60 inside the case 20 from detrimental environmental effects. When it is necessary to pressurize or depressurize the case 20, valve means 128 are provided. The valve means 128 permit a pressure controlling attachment to be attached thereto to regulate the internal pressure of the case 20.

The case 20 as illustrated and detailed in FIGS. 1-6 is combined with mounting means 128 to permit the case 20 to be removably retained in a protective housing 26. FIGS. 7 and 9 illustrate two variations of mounting means 128 as well as protective housing means 26. FIG. 7 illustrates, in phantom line, a type of protective housing 26 known as a pedestal housing. The pedestal type protective housing 26 is mounted to a base such that it projects above the surrounding area and provides a removable panel to permit access to the case 20 retained therein. The vault type protective housing 26 illustrated in FIG. 9 is generally secured below the surrounding surface to permit concealed installation of splice cases 20.

The mounting means 128 employed in the vault protective housing 26 of FIG. 9 include at least one bracket member 130 and an attachment portion 132 which is attached to the inside 134 of the vault 26. Case holding means 136 formed on an end of the bracket member 130 is cooperatively formed for retaining and easily removing the case 20 and for permitting easy removal of the case 20 therefrom. No fasteners are employed, rather the case is resiliently embraced by bracket 132. Further, it should be noted that the second retaining means 52 provide support and routing for the service cables 40 projecting from the case 20 even when the case is turned on a side orientation as shown in FIG. 9.

Elements of alternate bracket member 130a illustrated in FIGS. 7 and 8 which perform like functions to parts of the bracket member 130 in FIG. 9 are designated by like reference numerals with the suffix "a".

As shown in FIG. 7 and in greater detail in FIG. 8, the bracket member 130a is comprised of an attachment portion 132a attached to the inside of the protective housing 26 and case holding means 136a which securely attaches to the splice case 20 with fasteners 137. The bracket member 130a illustrated in FIG. 7 permits the case 20 to be positioned in a stored position (shown in solid lines) or a field access position (shown in phantom line). The bracket member 130a functions such that the case 20 in the field access position is generally vertically parallel to the stored position. When the case 20 is positioned in the stored position locking means 138 secures the bracket member 130a into generally vertical alignment. When the locking means 138 are disengaged from the bracket member 130a the case 20 attached to the bracket member 130a may be moved out of the protective housing 26 generally following a path of travel illustrated by arrows 140.

As shown in FIG. 8 with reference to FIG. 7, the bracket member 130a comprises several elongate members joined in an articulated manner to facilitate movement of the case 20 out of the protective housing 26. The attachment portion 132a attaches to the inside of the protective housing 26 by means of fasteners 142 projecting through openings 144 formed therethrough. An extension member 146 is attached to the attachment portion to space the mounting means 128 away from the inside surface. A lower parallel member 148 is operatively attached at a lower end 150 to the extension member 146. An upper end 152 is operatively attached to the case holding means 136a. An upper parallel member 154 has an upper end 156 operatively attached to the case holding means 136a and a lower end operatively attached to the extension member 146. When the case 20 is removed from the protective housing 26 the case holding means 136a maintains a generally parallel orientation with respect to the securely mounted attachment portion 132a and extension member 146 as well as the protective housing 26. Further, the lower and upper parallel members 148, 154 remain generally parallel relative to one another and provide horizontal extension of the case 20 attached to the case holding means 136a when the case 20 is removed from the protective housing 26.

While particular embodiments of the present invention have been shown and described in detail herein, it may be obvious to those skilled in the art that changes and modifications of the present invention in its various aspects, may be made without departing from the invention in its broader aspects, some of which changes and modifications being matters of routine engineering or design, and others being apparent after study. As such, the scope of the invention should not be limited by the particular embodiments and specific constructions described herein, but should be defined in the appended claims and equivalents thereof. Accordingly, the aim of the appended claims is to cover all such changes and modifications as fall within the true spirit and scope of the invention.

The invention is claimed as follows:

1. A splice case for retaining optical fiber splice connections, said case comprising: removably interconnectable members including a base member and a cover member, a plurality of apertures formed through said case for receiving cables therethrough; first retaining means for retaining at least one primary cable projecting through one of said apertures into said case, said primary cable comprising a multiple carrier fiber bundle including multiple carrier fibers; second retaining means for retaining at least one service fiber extending through one of said apertures into said case; fiber connecting means for retaining one of said carrier fibers and said at least one service fiber in a splice connection formed therebetween; means for dividing said case into at least a first chamber and a second chamber, said first chamber being formed for containing said carrier fibers and said second chamber being formed for containing said at least one service fiber, said first chamber being accessible by removing said cover member.

2. A splice case according to claim 1, wherein said primary cable is a loop through cable, and further including a common aperture formed through said case through which said primary cable enters and exits said case, an entering portion of said loop through cable projecting into said case through said common aperture and an exiting portion of said loop through cable projecting out of said case through said common aperture.

3. A splice case according to claim 2 and further including primary cable sealing means for sealing said entering and exiting portions of said primary cable projecting through said common aperture.

4. A splice case according to claim 3, wherein said primary cable sealing means comprises; a resiliently compressible sealing puck, said puck being positionable in said common aperture, at least two bores formed through said puck for receiving said entering and exiting portions of said primary cable; and puck retaining means for creating sealing forces between said puck and said common aperture and between said at least two bores and said entering and exiting portions of said primary cable.

5. A splice case according to claim 4, wherein said puck is an integral single piece disc-shaped member, a diameter of said puck being greater than a thickness measurement of said puck.

6. A splice case according to claim 5, wherein at least two radial slits are formed in said puck intersecting said bores for inserting said entering and exiting loop through cable portions into said bores, each of said at least two radial slits extending radially from a corresponding one of said at least two bores and at least one of said at least two radial slits extending through an outside edge of said puck.

7. A splice case according to claim 5, wherein said puck is formed of a resilient material having a durometer measurement of substantially on the order of 40.

8. A splice case according to claim 1, wherein said dividing means comprises bulkhead means which divides said case into said first chamber and said second chamber, said bulkhead means further supporting said fiber connecting means for retaining said at least one carrier fiber and said at least one service fiber in a splice connection.

9. A splice case according to claim 1 further including exterior service fiber retention means adjustably attached to an external surface of said case for routing and supporting service fibers extending from said case.

10. A splice case according to claim 1 further including a bottom member and latch means operatively attached to said base member and engageable with at least one of said bottom and said cover member for releasably retaining said at least one of said bottom and said cover member in engagement with said base member.

11. A splice case according to claim 10 further including environmental sealing means comprising; a cover member sealing means positioned between said cover member and said base member; bottom member sealing means positioned between said bottom member and said base member; aperture sealing means; and primary cable sealing means.

12. A splice case according to claim 6 further including valve means operatively attached to said case for controlling internal pressure in said case when said interconnectable members are assembled and sealed to seal the contents of the case against detrimental environmental effects.

13. An environmentally sealed optical fiber splice case in combination with primary cable sealing means not requiring taping or sealants, said case comprising; at least a base member and a cover member engageable with said base member; apertures formed in said case for receiving cables therethrough; said primary cable sealing means comprising a resilient sealing puck and puck retaining means, said puck being positionable projecting through one of said apertures, at least one bore formed in said puck for permitting passage of a primary cable therethrough, retaining means operatively attached to said case for retaining said puck in said aperture and for creating sealing forces between said puck and said aperture in which it is positioned and also between said primary cable and said at least one bore formed in said puck through which said primary cable passes; said primary cable being a loop through cable having two portions projecting through said aperture in said case, an entering portion of said primary cable projecting into said case and an exiting portion of said primary cable projecting out of said case, said puck being formed with at least two bores formed therethrough, each of said at least two bores receiving one of said entering and exiting portions of said primary cable.

14. A combination according to claim 13, wherein said puck is an integral single piece disc-shaped member, a diameter of said puck being greater than a thickness measurement of said puck.

15. A combination according to claim 13, wherein said puck is formed of a resiliently material having a durometer measurement of substantially on the order of 40.

16. A combination according to claim 13, wherein at least two radial slits are formed in said puck intersecting said bores for inserting each of said entering and exiting loop through cable portions into a respective one of said at least two bores, each of said at least two radial slits extending radially from a corresponding one of said at least two bores and at least one of said two radial slits extending through an outside edge of said puck.

17. An optical fiber splice case in combination with mounting means for removably retaining said case inside an accessible protective housing; said case having means for retaining optical fiber splice connections and means for protecting said optical fiber splice connections from adverse environmental effects; and said mounting means including attachment portions for attaching said mounting means to said protective housing and case holding means for releasably retaining said case relative to said mounting means; wherein said mounting means comprises a plurality of articulated elongate members which selectively retain said case in said protective housing, at least one of said members having said attachment portions for attaching said mounting means to said protective housing; said plurality of articulated elongate members being joined to facilitate retainably supported movement of said case attached thereto from an orientation retained in said protective housing to a position projecting outwardly thereof.

18. A combination according to claim 17, wherein said mounting means comprises at least one bracket member having said attachment portions defined thereon attached to said protective housing and case holding means formed for cooperatively removably retaining said case positioned therein.

19. A combination according to claim 17, wherein said attachment portions are pivotally attached to an internal surface of said protective housing and a second of said articulated members is pivotally attached to said case holding means, said case being attached to said holding means such that said case is pivotally swingable outwardly of said protective housing when said mounting means pivotally moves, said case remaining in an orientation substantially parallel to said protective housing permitting access to said case outside of said protective housing and in a generally parallel position relative to said protective housing.

* * * * *